May 11, 1937.  H. GASTROW  2,079,936
DIE CASTING MACHINE
Filed May 22, 1935
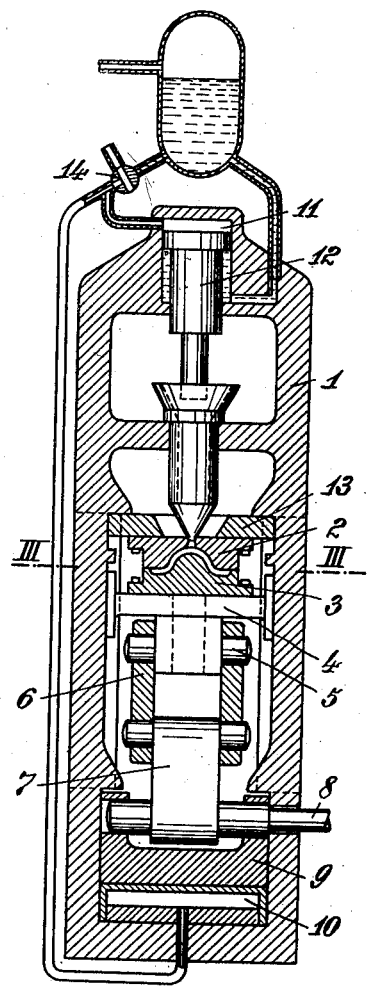
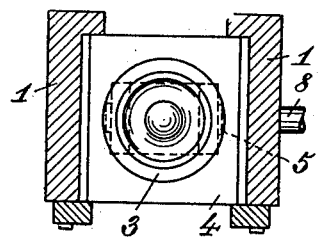
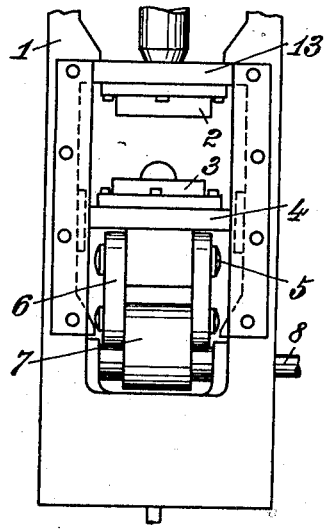
Inventor:
Hans Gastrow
By Emil Bömelyche
Attorney Patented May 11, 1937

2,079,936

UNITED STATES PATENT OFFICE 2,079,936

DIE CASTING MACHINE

Hans Gastrow, Zerbst in Anhalt, Germany, assignor to Firma Franz Braun Akt.-Ges., Zerbst in Anhalt, Germany Application May 22, 1935, Serial No. 22,893
In Germany May 25, 1934

2 Claims. (Cl. 18—30)

The present invention relates to a spray casting machine which is operated by means of a pressure medium.

In spraying machines for plastic masses the material to be formed is pressed into the closed mould through a narrow opening in the nozzle. The pressing in of the more or less viscous masses into the mould requires very high pressures (up to 1000 kg. per cm.² and more) which tend to open the mould. If the closing device of the mould for instance has the form of a toggle joint, the pressure within the mould will cause, that the elements of the toggle joint, in accordance with the dimensions of the article to be formed, are subjected to a pressure which may amount to several tons, wherefore in the loaded elements of the joint very high frictional forces arise which render it very difficult to open the mould. This again involves the drawback, that a very great momentous work must be performed and that very strong operating means must be used. Another drawback is, that the parts of the closing device are fastly worn out.

It has therefore already been proposed to move the mould slide by means of a liquid pressure medium. However, since the forces which keep the form closed always must be larger than the opposing forces created in the interior of the mould by the injection process and since the opening paths of the two halves of the mould are rather long the consumption of pressure medium at each opening or closing is relatively high.

In the spray casting machine according to the present invention the opening and closing movements of the mould, which per se are pure no-load movements requiring only very small force, are performed manually or by means of an electro-motor in a manner known per se. After the closing movement has been performed, which brings both halves of the mould into the closed position without placing the same under pressure, the required pressure is derived from the pressure liquid or compressed air used for the operation of the spraying piston.

For this purpose according to the invention one of the counter bearings, through which the pressure forces are transmitted from the mould to the frame of the machine, is made movable and during the injection process is so loaded by means of a pressure device, that the closing power surpasses the forces created by the injected material in the interior of the mould. The counter bearing may advantageously consist of a hollow body which is closed on all sides and has elastical bottom and top faces or of a piston which is slidably arranged in a cylinder.

A constructional form of the invention is shown schematically by way of example in the accompanying drawing.

Fig. 1 is a central vertical section through a spraying machine for plastic masses according to the invention.

Fig. 2 is a partial view of the same machine.

Fig. 3 is a cross-section taken on the line 3—3 in Fig. 1.

The frame 1 takes up the forces created by the injection pressure and by the mould closing pressure. The two halves 2, 3 of the mould are by means of screws attached to the upper mould slide 13 and the lower mould slide 4 respectively. The lower mould slide 4, which is guided by guide rails (not illustrated) is brought into the open or closed position of the mould by rotation of the shaft 8 which actuates the toggle lever arrangement 5, 6, 7. When no pressure forces are acting within the mould this movement may easily be performed. The crank 7 is arranged in a bracket 9, which within certain limits is freely movable in the direction of movement of the mould. The forces acting on the bearing bracket or counter bearing 9 are transmitted to the machine frame through a hollow body 10, which is closed on all sides and has elastical bottom and top faces. Instead of this hollow body a piston and cylinder arrangement may be employed and it is also possible to use a device in the form of covers catching into or projecting over each other like a flat box, so that it, when filled with pressure oil or compressed air, will force the bearing block 9 upward and press the two halves 2, 3 of the mould against each other. The force with which the body 9 is pressed upward by the pressure medium must be larger than the force which is created in the mould by the injected material and which strives to force the two form halves apart. Only in such case the formation of a burr at the joint between the parts of the mould is avoided. It is connected with no difficulties to give the parts such dimensions, that the necessary over-pressure can be produced.

The hollow body 10 is placed under pressure simultaneously with the working cylinder 11, so that the real closing pressure of the mould first is produced at the commencement of the working stroke of the injection piston 12. During the upward movement of the working piston 12 the hollow body 10 is relieved, in that the valve 14 is brought into the position shown in Fig. 1, in which the pressure medium will flow off to the storage container of the compressor. In this state the closing pressure is balanced and the mould can therefore easily be opened by actuating the toggle joint. The device for opening and closing the mould may consist of a toggle joint, a spindle gearing or the like and can be so connected with the control mechanism for the valve or cock through which the pressure medium for the injection piston is let in and drawn off, that the machine will work fully automatically. The invention is also applicable to machines in which plastic masses are not treated but in which high closing pressures are required, such as for instance in metal spraying machines.

I claim:—

1. A die casting machine comprising two mould halves one of which is movable relative to the other, a mechanical closing device for moving the movable mould half against the other mould half, a movable counter bearing connected to the closing device, and a hydraulic pressure device for exerting the injecting pressure for the material to be die cast in the mould halves and also exerting pressure on the counter bearing, the closing pressure for the mould halves exceeding the injecting pressure for the material to prevent opening of the mould halves and the formation of burrs on the casting.

2. A die casting machine according to claim 1 in which the counter bearing is operable in a cylinder in which the counter bearing slides and receives the hydraulic pressure, the surface of the counter bearing on which the hydraulic medium acts exceeding the surface on which the injecting pressure acts.

HANS GASTROW.